United States Patent

Kunkle

[15] 3,658,505

[45] Apr. 25, 1972

[54] GLASS MELTING FURNACE

[72] Inventor: Gerald E. Kunkle, New Kensington, Pa.

[73] Assignee: PPG Industries, Inc., Pittsburgh, Pa.

[22] Filed: May 22, 1969

[21] Appl. No.: 826,861

[52] U.S. Cl. ...............................................65/337, 65/355
[51] Int. Cl. ........................................................C03b 5/22
[58] Field of Search..................65/27, 168, 338, 342, 343, 65/355, 356, 337

[56] References Cited

UNITED STATES PATENTS

| 1,538,215 | 5/1925 | Reece | 65/125 |
| 1,579,353 | 4/1926 | Good | 65/337 |
| 1,667,145 | 4/1928 | Diederichs | 65/342 X |
| 1,835,690 | 12/1931 | Bowman | 65/356 X |

*Primary Examiner*—Arthur D. Kellogg
*Attorney*—Chisholm and Spencer

[57] ABSTRACT

A glass melting tank having side compartments with coolers disposed therein to increase the convection current mixing flow of the glass melt in the glass melting tank.

6 Claims, 5 Drawing Figures

Patented April 25, 1972

INVENTOR
GERALD E. KUNKLE

BY Chisholm and Spencer

ATTORNEYS

Patented April 25, 1972

INVENTOR
GERALD E. KUNKLE

BY

ATTORNEYS

GLASS MELTING FURNACE

BACKGROUND OF THE INVENTION

Window glass melting tanks are generally constructed with restricted necks through which molten glass flows from the refiner into the drawing kilns. In order to skim surface impurities from the glass and to reduce the velocity of the glass flow from the melter into the refiner, a clay refractory floater is located across the restricted neck, such that glass must pass thereunder in flowing from the refiner to the kilns. At the opposite sides of the melting tank and before the restricted neck, there are skim kilns or doghouses, each of which has a clay refractory floater across its entrance. A typical glass melting tank is illustrated in Gaunder U. S. Pat. No. 2,363,954, the disclosure of which describes, at least in part, the various functions of the clay refractory floaters — neck floater and skim kiln floaters — and also the general flow of glass between the melter and the refiner. The disclosure of the Gaunder patent is incorporated herein by reference.

When neck floaters are removed from a window glass tank, the forward flow of glass increases significantly and the temperature of the glass flowing into the drawing kilns also increases significantly, requiring conditioning to a lower temperature for drawing. Melter residence time and temperatures also decrease. When doghouse floaters are removed, there is a great possibility of contaminated glass or glass of less than desired quality flowing into the drawing kilns, resulting in poor metal quality in the glass being drawn or interruptions in the draw because of poor quality glass.

While the use of floaters is advantageous, there are disadvantages in using the conventional clay refractory floaters. Clay refractory dissolves in glass, so that after a period of use, the floaters must be replaced. Besides introducing contaminants into the molten glass, the thermal effects of the floaters is constantly changing. When replacing a floater, production time is lost because of the upset in the operation and subsequently because of slow decay of flow disturbance. Lead time in acquiring floaters is necessary because they must be fired prior to use. At any rate, the replacement of floaters is costly.

THE INVENTION

According to the invention, the clay refractory floaters are replaced with fluid-cooled members which may be partially or completely submerged in the molten glass. Suitable fluid-cooled members are constructed of stainless steel pipes. A suitable cooling fluid is water, or "Therminol," a generally well-known heat exchange fluid.

The temperature effects of water-cooled pipes on molten glass can be controlled by selecting a pipe size and location, and secondarily, by controlling the temperature of the cooling water and its velocity through the pipe. Frequent replacement of water-cooled pipes is avoided; replacement becomes necessary in case of a cooling-water failure; proper stand-by equipment and supplies can avoid such failure. Inasmuch as the temperature of the pipe in contact with the glass is below that of the glass, a layer of solidified glass forms around the pipe. Glass-to-glass contact avoids contamination of the glass from exposure to the material of the pipe. Devitrification occurs but is not a problem because the devit is covered by viscous glass.

Operating conditions can be optimally established and maintained by setting of the pipe depth. When change is desired, it can be effected by changing the location and depth of the pipe.

THE DRAWINGS

Figure 1:
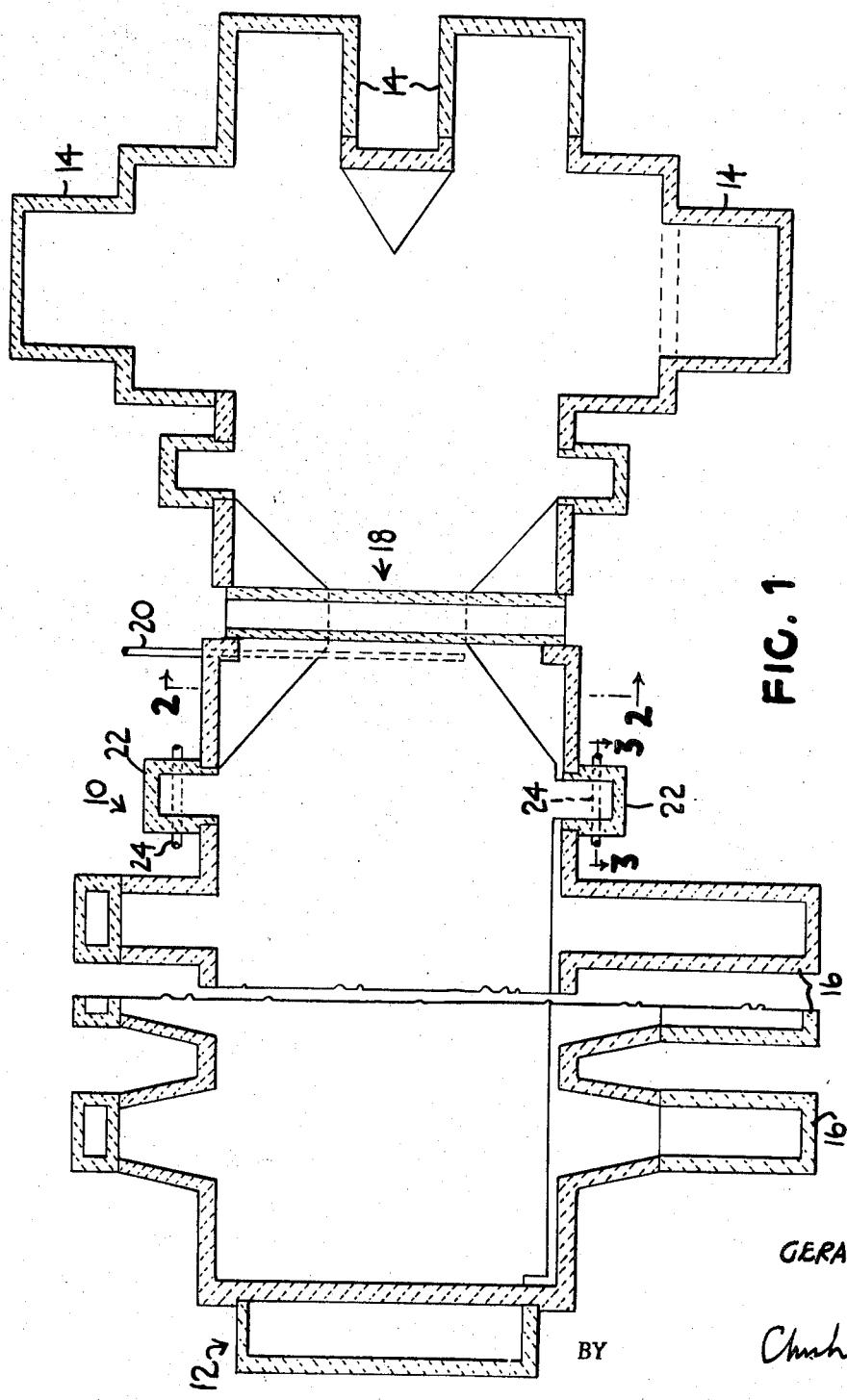
FIG. 1 is a plan view of a typical glass melting tank with water-cooled members in this operating position.
Figure 2:
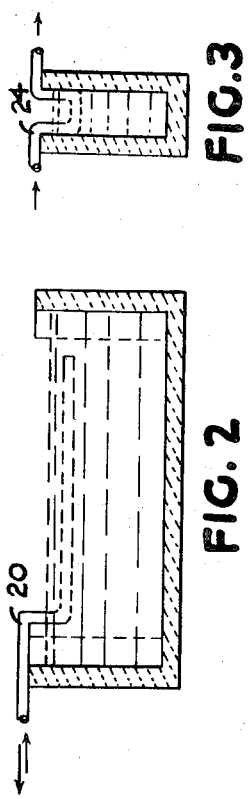
FIG. 2 is a sectional view taken on line 2—2 of FIG. 1.
Figure 3:
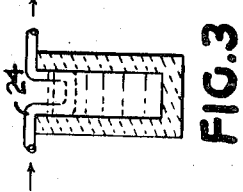
FIG. 3 is a sectional view taken on line 3—3 of FIG. 1.
Figure 4:
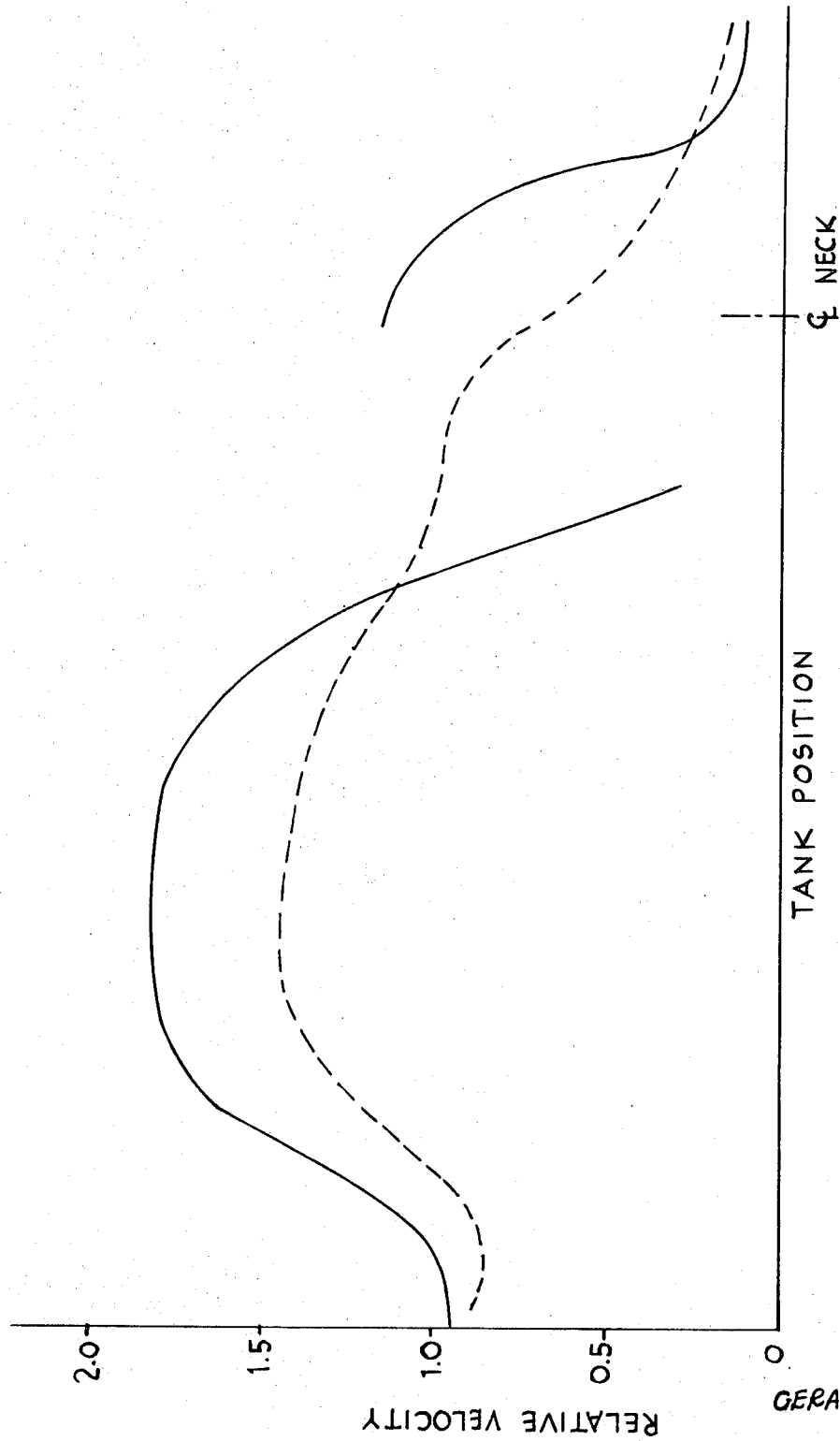
Figure 5:
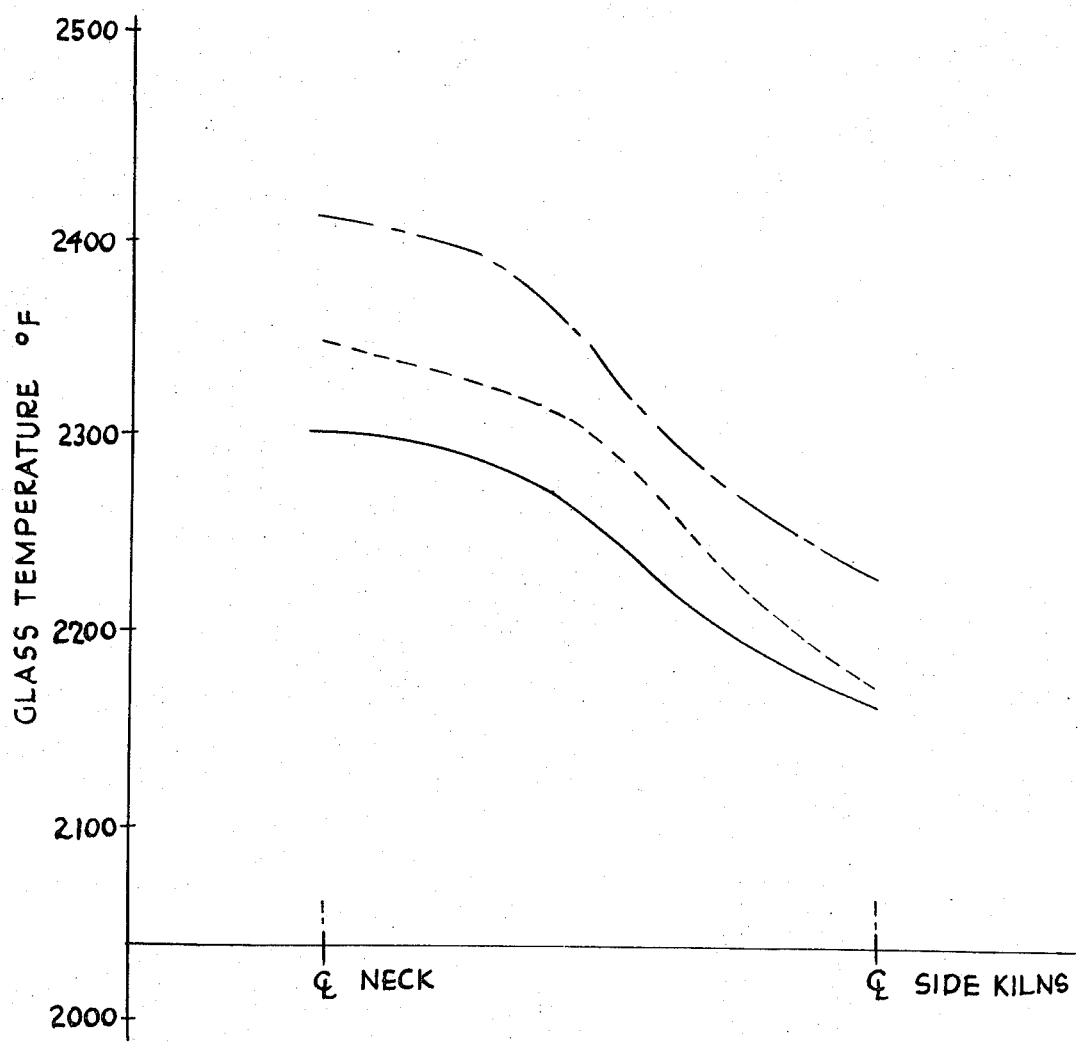

FIGS. 4, and 5 are graphs illustrating the effects of the invention on the glass in the melting tank of FIG. 1.

THE PREFERRED EMBODIMENT

In FIG. 1, there is illustrated a typical glass melting tank 10 adapted to contain a body of molten glass which moves generally from a batch feeding end 12 toward a drawing end of the tank where drawing bays 14 are located. During the tank operation, the glass ingredients are melted and maintained in molten condition by means of flames from suitable fuel fed through side ports 16 along the sides of the tank. In this type of apparatus, known as a regenerative tank, the flames are played over the surface of the body of glass alternatively at proper intervals from opposite sides of the tank. Ordinarily, tanks of this type are operated continuously over considerable periods of time.

Before entering the forward portion of the tank, the mOlten glass passes through a restricted neck 18 and past a fluid-cooled member 20. This member, generally constructed of a stainless steel pipe or pipes for the passage of cooling water therethrough, controls the flow of glass through the neck 18. Some impurities in the glass will be directed, by the member 20, into skim kilns, compartments or doghouses 22 on opposite sides of the tank and before the neck 18. A fluid-cooled member 24 is positioned across each skim kiln and between the side walls thereof. Like the member 20, the members 24 are constructed of stainless steel pipes for the passage of cooling water therethrough. The position of the members 20 and 24 is adjustable by any suitable mechanism, such that the depth of the members 20 or 24 in the glass can be adjusted. The members 24 control the flow of glass into and out of the skim kiln such that by cooling glass flowing therein; the path of the glass back into the tank is such that it does not return directly into the flow of glass to the drawing bays.

In tanks of this type, there is a return flow of glass from the drawing bays back to the melter, such that colder glass flow back, becomes heated and flows again forward. Thus the relatively cold glass in the skim kilns flows into the return flow and again becomes heated.

Cooling of the glass by the member 20 retards the flow into the drawing bays and provides increased time in the melting tanks, resulting in increased time for refining and better quality glass.

Adjusting the depths of the members 20 and 24 provides a means whereby flows can be controlled as desired.

To illustrate the effects of the water-cooled members on glass in a tank similar to that illustrated in FIG. 1, attention is directed to FIGS. 4 and 5.

In FIG. 4, a comparison of the center line velocities is made. The velocities are plotted against tank position. The solid line represents the surface velocity curve when a clay neck floater is used. The broken line is the curve when a water-cooled pipe is used instead of the clay refractory floater. The important point is that the velocities are lower. This results in cooler front end and better control. Also more efficient melting and improved refiner conditions.

FIG. 5 compares refiner surface temperatures for several arrangements. The solid line represents the temperature curve when clay floaters are used; the dot-dash line is the curve when no floaters are used; and the broken line is the curve when water-cooled members are used. The former and the latter are similar. When no floaters are used, the surface temperatures and velocities are considerably higher.

I claim:

1. A glass melting tank having side and end walls and a bottom through which tank molten glass flows from a feeding end to a working end of said tank, said side walls each being provided with at least one opening and compartments extending a substantial distance outwardly from an opening in the side of the tank so as to permit the flow of molten glass in said tank into and out of each said compartment, each said compartment having upwardly extending side walls projecting a substantial distance outwardly from said tank, and an end wall, said walls of said compartment extending from a level above the surface of the molten glass in said tank to a location near the bottom of said tank, and a fluid-cooled member disposed in each said compartment and extending across said compartment between said side walls at a location near but below the surface of the molten glass in said tank for cooling a portion of the molten glass flowing into said compartment so that the cooled glass flows downwardly in said compartment and thence from said compartment into said glass melting tank in order to cause countercurrent flows of glass within said tank which assist in refining sail molten glass.

2. In a glass melting tank as recited in claim 1, wherein said fluid-cooled members are constructed of metal pipes for the passage of cooling fluid therethrough.

3. In a glass melting tank as recited in claim 2, wherein said cooling fluid is water and further including means for supplying cooling water to said pipes.

4. A glass melting tank as set forth in claim 1, having a restricted neck intermediate said ends and a fluid cooled member disposed in said glass melting tank positioned lengthwise of said restricted neck and located between the feeding end of said tank and said restricted neck, said fluid cooled member being positioned adjacent but in spaced relation with respect to said restricted neck at a location near but below the surface of the molten glass flowing past said restricted neck toward said working end, whereby glass flowing toward said restricted neck is cooled so that cooled glass flows downwardly in said tank to provide countercurrent flows of glass within said tank which assist in refining said molten glass.

5. In a glass melting tank as recited in claim 4, wherein said fluid-cooled members are constructed of metal pipes for the passage of cooling fluid therethrough.

6. In a glass melting tank as recited in claim 5 wherein said cooling fluid is water, and further including means for supplying cooling water to said pipes.

* * * * *